Aug. 7, 1928.
W. McARTHUR, JR
1,679,908
MOTOMETER MOUNTING AND LOCK
Filed April 6, 1925
2 Sheets-Sheet 1
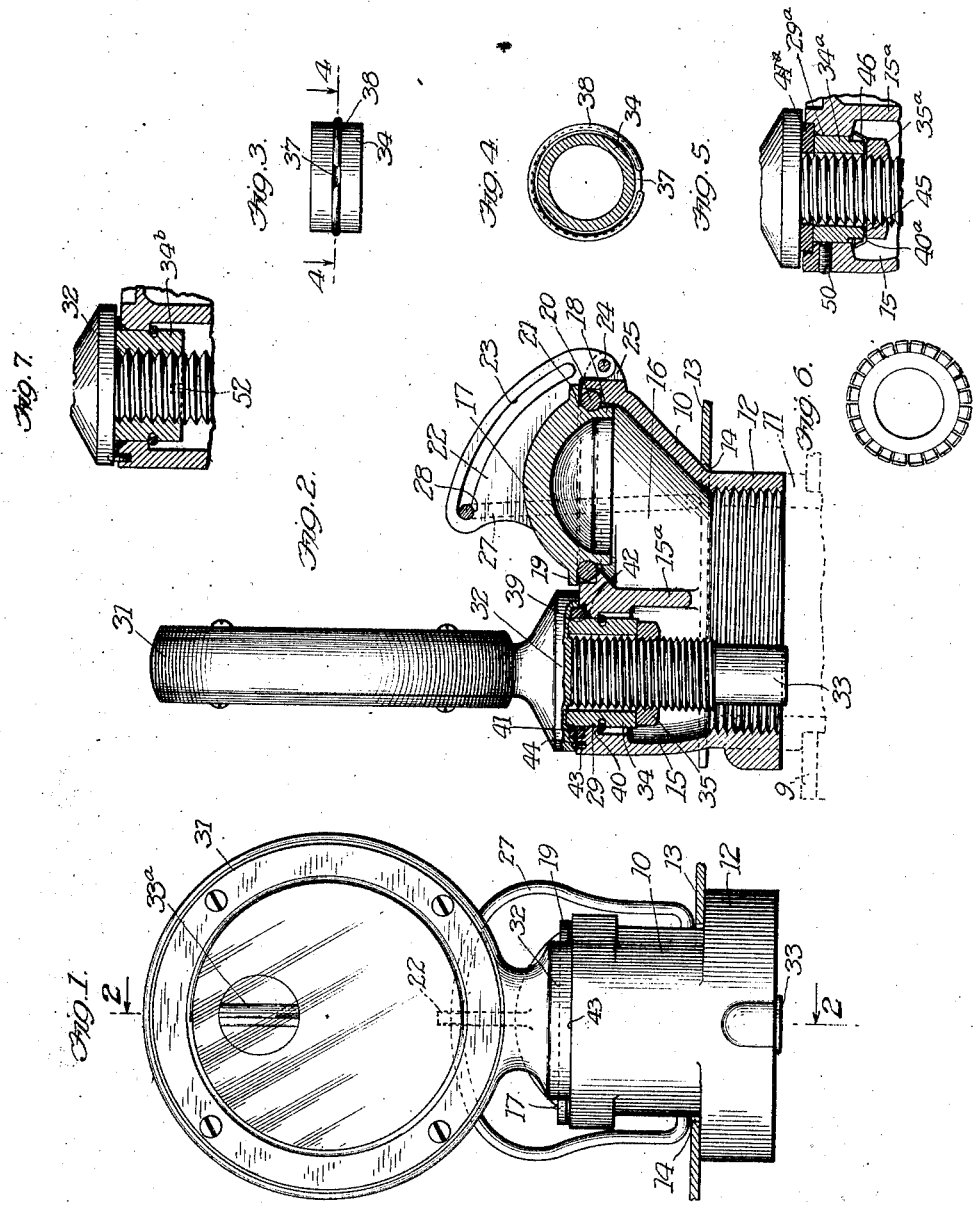

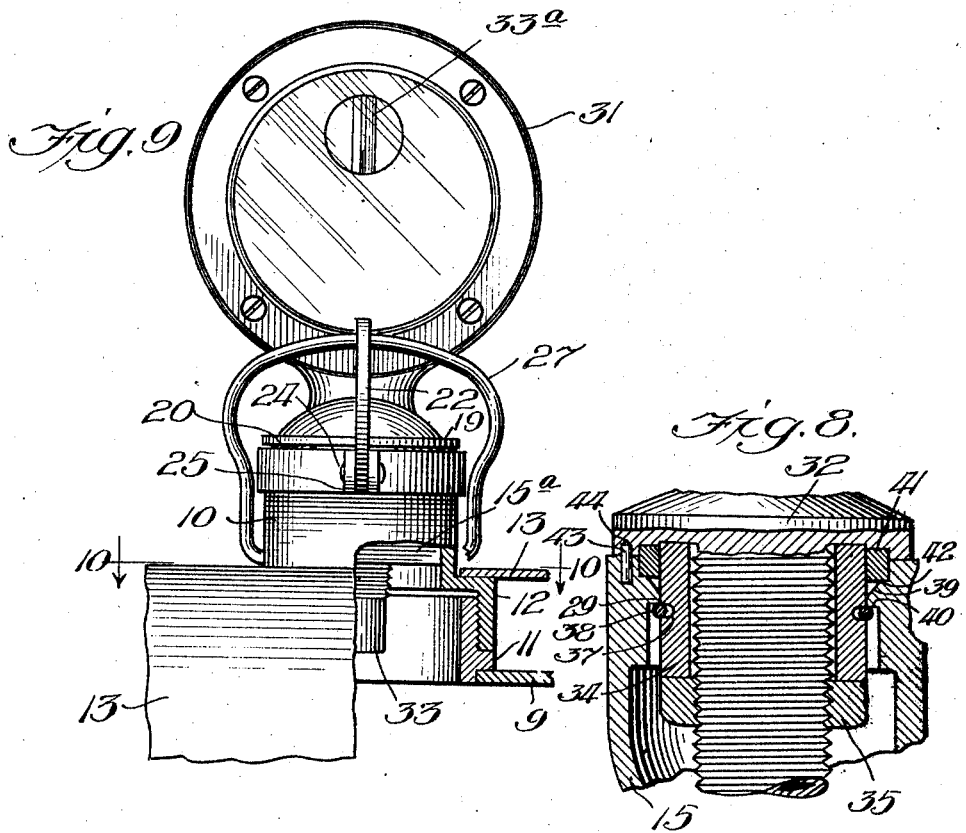

Patented Aug. 7, 1928.

1,679,908

UNITED STATES PATENT OFFICE.

WARREN McARTHUR, JR., OF PHOENIX, ARIZONA, ASSIGNOR TO McARTHUR BROTHERS MERCANTILE CO., OF PHOENIX, ARIZONA, A CORPORATION OF ARIZONA.

MOTOMETER MOUNTING AND LOCK.

Application filed April 6, 1925. Serial No. 20,909.

This invention relates more particularly to improvements in locking devices for securing temperature gauges or indicators, such as the well known "motometer", in position on automobile radiators to prevent the theft or surreptitious removal of the gauges.

I am aware that prior to my invention, it had been suggested that the motometers be mounted on the filling spouts or necks of the radiators, and be locked in position thereon by nuts or other suitable means placed on the stems of the motometers after the stems had been projected through openings in the spouts, which were to be permanently secured to the radiators to prevent any removal of the motometers. With such constructions, however, the manufacturer of the automobiles would be obliged to assemble the motometers on the spouts at the factory and ship the automobiles with the motometers already in place on the radiators, as it would not be feasible or practical to ship the ornamental shells for the radiators and the spouts unassembled on the automobiles and require the agents, dealers or purchasers of the automobile to assemble such parts. It is not desirable to ship the automobiles with the motometers in place on the radiators, as the motometers are likely to become broken or damaged while the automobiles are in transit. Furthermore the automobile manufacturer may not wish, as a matter of policy, to supply and sell motometers with the automobiles, as the dealers or customers can readily purchase such an accessory anywhere and if the filling spouts are already assembled on the radiators the motometers could not be readily mounted and locked in position on the spouts.

One of the principal objects of my invention is to provide an improved mounting device and locking means for motometers so constructed that motometers may be attached quickly and expeditiously to the filling spouts, (necks or other extensions) on the radiator, but can only be removed from the spouts when the latter have been detached from the radiators. To this end, I have provided means carried by the stem of the motometer and so constructed that when the stem is projected through an opening in the spout a latching device automatically locks the motometer in position, the latching device being disconnected from the stem of the motometer from the inside of the spout only when the spout is removed from the radiator.

Other and incidental objects of my invention will become apparent from the following description, taken in conjunction with the accompanying drawings, wherein Figure 1 is a front elevation of a motometer and radiator spout, embodying my invention with part of the radiator shell shown in section and somewhat diagrammatically; Fig. 2 is a longitudinal section taken through the radiator spout, as on the line 2—2 of Fig. 1, the motometer being shown in side elevation; Fig. 3 is a side elevation of the sleeve and spring locking ring carried by the stem of the motometer; Fig. 4 is a detail horizontal sectional view, taken on the line 4—4 of Fig. 3; Fig. 5 is a fragmentary sectional view showing a modified form of my invention; Fig. 6 is a plan view of the locking ring shown in Fig. 5; Fig. 7 is a fragmentary sectional view showing still another modification of my invention; Fig. 8 is an enlarged fragmentary sectional view of the motometer, its support and locking mechanism shown in Fig. 1; Fig. 9 is a fragmentary front elevation of the radiator shell and the motometer installed on the radiator in accordance with my invention, being shown partially in section to illustrate the relation of the parts; and Fig. 10 is a horizontal section taken on line 10—10 of Fig. 9.

Referring to Figs. 1 and 2, the radiator spout 10 has an enlarged circular boss 12 at its lower end which is internally screw-threaded so that it may be screwed into place on the ordinary threaded extension or boss 11 of the radiator 9. As best shown in Fig. 1, the ornamental shell 13, for covering the radiator, is provided with a slot or opening 14 and the shell on each side of the slot projects over the boss 12 to hold the spout in position on the radiator while the shell is in assembled position on the automobile (see Figs. 1, 2, 9 and 10) and to prevent removal of the spout only upon removal of such shell. The shell 13 may be removably secured to the radiator 9 or other suitable part of the automobile in any desired manner. I have not shown the radiator 9 or the shell 13 in full detail as these may be of any standard or approved types. In assembling the automobiles, the manufacturer screws the spouts into position on the radiators and then fits the shell over the radiator core with the spout projecting through the opening 14 in the shell.

As shown in Fig. 2, the filler spout is formed to provide a filling duct 16 and a tubular chamber 15 separated by a common wall or baffle 15$^a$. A cap or cover 17 for closing the duct 16 may be of any suitable form, but preferably I have shown a circular cap having a circular depending flange 18 projecting into the upper end of the duct when the cap is in closed position. The cap 17 is provided with a radial circumferential flange 19 extending over a gasket 20 which is circular in cross-section and is carried in a groove 21 formed in the depending flange 18. The cap is provided with a vertical plate 22 having an arcuate slot 23. A hinge pintle 24 projects through ears 25 on the spout and through an opening in the plate 22 to pivot the cap to the spout. A spring bail 27 has its opposite ends seated into holes in the spout and the center of the bail projects through the slot 23. When the cover 17 is latched in closed position by the bail, the latter is seated in a notch 28 in the upper end of the slot 23. When the cap is to be opened the bail is swung backwardly and, due to the action of the bail in the slot 23, the cap is swung open.

The motometer, illustrated in the drawings, is of a well known type and comprises a circular housing 31, a base 32, a screw-threaded stem 33 and a thermometer 33$^a$. Positioned on the upper end of the stem is a sleeve 34, the upper end of which is pressed firmly against the base 32 by a nut 35 screwed onto the threaded stem. The sleeve is provided with a circumferential groove 37 in which is seated a split spring ring 38. The upper edge of the opening 29, formed in the upper end of the tubular portion 15 of the spout, is slightly beveled as indicated at 39 and the lower portion of the opening is enlarged in diameter to provide an overhanging shoulder 40.

From the above description it will be obvious that when the motometer is to be attached to the spout it is only necessary to insert the stem 33, together with the sleeve 34 and the nut 35 mounted thereon, into the opening 29. During this inserting movement, the beveled edge 39 forces the spring ring to contract so that it is positioned entirely within the groove 37. As the spring passes below the shoulder 40 it springs outwardly under the shoulder thereby locking the motometer against removal. The spring 38 bears firmly against the shoulder 40 while the base 32 near its outer edge bears against the top of the spout and the sleeve 34 fits snugly in the opening 29 so that the motometer is held firmly in position, thus avoiding rattle of the motometer on the spout. A gasket 41 is seated on a shoulder 42, formed at the upper end of the opening 29, to provide a sealed joint. In order to remove the motometer for any reason, it is first necessary to remove the radiator shell and unscrew the spout from the radiator and then by means of a suitable tool unscrew the nut 35 from the stem 33 of the motometer so that the sleeve 34 can be slid off of the stem 33 to permit the motometer to be removed.

In Fig. 2 I have shown a headless screw 43 screwed into a threaded opening in the upper edge of the tubular portion 15 of the spout, the upper end of the screw being pointed so that it engages in a recess 44 in the base 32 of the motometer to prevent turning movement of the motometer and thus hold it in proper angular position on the spout.

In the modification shown in Fig. 5, I have shown a gasket 41$^a$ between the upper end of the sleeve 34$^a$ and the base of the motometer. A ring 40$^a$ of resilient metal has a flat portion 45 secured between the lower end of the sleeve 34$^a$ and the nut 35$^a$ and the ring is also provided with a plurality of upwardly and downwardly extending fingers 46. The lower end of the sleeve is reduced in diameter. While the motometer is being applied to the mounting, the fingers 46, as they pass through the opening 29$^a$, are bent inwardly into engagement with the lower reduced portion of the sleeve, and as the motometer is moved to its final position the fingers 46 spring outwardly and engage against the overhanging shoulder 40$^a$ on the spout, thus locking the motometer in position on the spout. In order to permit the removal of the motometer, it is necessary to remove the radiator shell and spout and then remove the nut 35$^a$ and the locking ring 40$^a$ as in the preferred form. In this modified form, I have shown a set screw 50 screwed into a horizontal threaded opening in the spout and having its rear end forced firmly into engagement with the sleeve 34$^a$ to prevent rotation of the motometer.

In Fig. 7 I have shown a modified construction, which is similar to that shown in Fig. 2 except that I have dispensed with the separate nut 35 and have screw-threaded the interior of the sleeve 34$^b$ so that it may be screwed onto the stem of the motometer. The lower end of the sleeve may have notches 52 or may be nut-shaped to permit it to be unscrewed by a suitable form of tool, after the spout has been removed from the radiator, in order to permit withdrawal of the motometer from the spout.

I claim:

1. The combination of a radiator filling spout having an opening, a motometer having a stem adapted to project through said opening, means on said stem permitting the motometer to be applied while the spout is attached to the radiator and preventing removal of the motometer from the spout except when the spout is detached from the radiator.

2. The combination of a radiator, a shell therefor, a filling spout secured to the radiator and removable only upon removal of the radiator shell, the spout having an opening, a motometer having a stem adapted to project through said opening, and means connected to said stem and permitting the motometer to be applied while the spout is on the radiator and preventing removal of the motometer except when the spout is detached from the radiator.

3. The combination of a radiator, a hollow extension having self-contained means for removably attaching the same to the radiator, additional means removable independently of said extension for rendering the latter removable from the radiator only upon removal of the former, a motometer, and means for permitting the motometer to be attached to the extension while the extension is on the radiator and preventing its removal while the extension is attached to the radiator, said means being operable to release the motometer only from the inside of said extension.

4. The combination of a radiator filling spout having an opening, a motometer having a stem, a sleeve on said stem, a device for holding the sleeve on the stem, a latching member associated with said sleeve and cooperating with said spout to permit the motometer to be attached to and locked on the spout by inserting the stem, with said sleeve, holding device and latching member thereon, through said opening, the latching means being rendered ineffective by removal of said holding device to permit the motometer to be detached from the spout.

5. The combination of a radiator filling spout having an opening, a motometer having a stem, a sleeve on said stem and adapted to fit in said opening, and latching means associated with said sleeve to permit the motometer to be applied to said spout and latched thereon by inserting the stem with the sleeve and latching means thereon through said opening, the sleeve and latching device being disconnectible from the stem from the inside of the spout to permit the motometer to be removed from the spout.

6. The combination of a radiator filling spout having an opening, a motometer having a threaded stem, a nut screwed on said stem, a sleeve on said stem prevented from sliding axially of the stem by said nut, and a latching device permitting insertion of said stem with the sleeve and nut thereon into said opening and locking the motometer in place thereon, the nut being removable from the stem only from the inside of the spout to permit the motometer to be removed from the spout.

7. The combination of a radiator, a spout having an opening and self-contained means for removably securing the same to the radiator, other means removable independently of said spout for preventing removal of the latter from the radiator only upon removal of the former, a motometer having a stem, a sleeve secured to and removable from said stem, a spring member adapted to snap into locking engagement with a shoulder on the spout when the stem with the sleeve thereon is inserted into said opening to lock the motometer in place on the spout, and means operable only when the spout is removed from the radiator for disconnecting the sleeve from the spout to permit the motometer to be detached from the spout.

8. The combination of a radiator spout having an opening and provided with a shoulder, a motometer having a threaded stem, an unthreaded sleeve adapted to fit in said opening and having a circumferential groove, a nut screwed on said stem for holding said sleeve on said stem, and a spring ring in said groove and adapted to be compressed within said groove while the motometer stem with the sleeve is being inserted through said opening and adapted to snap into engagement with said shoulder to lock the motometer on the spout, the nut being removable from the stem to permit the motometer stem to be withdrawn from the sleeve.

9. The combination of a radiator filling spout having an opening provided with an outer beveled corner and a shoulder, a motometer having a base and a threaded stem, a sleeve on the stem, a nut screwed on said stem and firmly pressing the upper end of said sleeve against said base, and a spring ring on said sleeve adapted to be compressed while the sleeve is being moved into the opening and adapted to snap into engagement with said shoulder to lock the motometer in position on the spout, the nut being removable to permit the motometer stem to be withdrawn from the sleeve.

10. In combination with a radiator filling spout having an opening, a motometer having a stem, a sleeve on said stem adapted to fit in said opening, a nut holding the sleeve on the stem, and means preventing the withdrawal of the sleeve from said opening, the stem of the motometer being axially removable from the sleeve when the nut is removed from the stem.

11. In combination with a radiator filling spout having an opening, a motometer having a threaded stem, a nut screwed on said stem, a sleeve on said stem prevented from sliding axially of the stem by said nut, a locking device permitting insertion of said stem with the sleeve and nut thereon into said opening and locking the motometer in place thereon, the nut being removable from the stem only from the inside of the spout to permit the motometer to be removed from the spout, and means for preventing rotation of the motometer.

12. In combination with a radiator, of a hollow extension having an opening and self-contained means for removably securing the same to the radiator, means removable independently of said extension for preventing removal of the extension from the radiator only upon removal of said last-mentioned means, a motometer having a base and a stem, means permitting the motometer to be attached to the extension by moving the stem axially into said opening and preventing its removal while the extension is attached to the radiator, and a pin on said extension adapted to engage in a recess on said base to prevent rotation of the motometer.

WARREN McARTHUR, Jr.